(12) United States Patent
Stout et al.

(10) Patent No.: US 10,389,095 B1
(45) Date of Patent: Aug. 20, 2019

(54) NETWORK INTERFACE DEVICES

(71) Applicant: AFL Telecommunications LLC, Duncan, SC (US)

(72) Inventors: Cecilia L. Stout, Greer, SC (US); David J. Lane, Chesnee, SC (US); Shirley Ball, Greer, SC (US); William Miller, Easley, SC (US); Joseph Cignarale, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/233,795

(22) Filed: Dec. 27, 2018

Related U.S. Application Data

(63) Continuation of application No. 16/026,871, filed on Jul. 3, 2018, now Pat. No. 10,230,226.

(51) Int. Cl.
*H02G 3/08* (2006.01)
*H02G 3/14* (2006.01)

(52) U.S. Cl.
CPC .............. *H02G 3/083* (2013.01); *H02G 3/14* (2013.01)

(58) Field of Classification Search
CPC .................................. H02G 3/083; H02G 3/14
USPC ........................................................ 174/562
See application file for complete search history.

(56) References Cited

U.S. PATENT DOCUMENTS

| | | | |
|---|---|---|---|
| 4,143,250 A | 3/1979 | Simokat | |
| 4,488,008 A | 12/1984 | Dellinger et al. | |
| 4,647,725 A | 3/1987 | Dellinger et al. | |
| 4,658,422 A | 4/1987 | Sparks | |
| 4,700,384 A | 10/1987 | Meyer | |
| 4,741,032 A | 4/1988 | Hampton | |
| 4,749,359 A | 6/1988 | White | |
| 4,800,588 A | 1/1989 | Poster, Jr. | |
| 4,827,504 A | 5/1989 | Collins et al. | |
| 4,910,770 A | 3/1990 | Collins et al. | |
| 4,932,051 A | 6/1990 | Karan et al. | |
| 4,945,559 A | 7/1990 | Collins et al. | |
| 4,949,376 A | 8/1990 | Nieves et al. | |
| 5,297,199 A * | 3/1994 | Graham | H04Q 1/028 379/412 |
| 5,312,266 A | 5/1994 | Daoud | |

(Continued)

FOREIGN PATENT DOCUMENTS

| | | |
|---|---|---|
| AU | 2015213278 B2 | 4/2017 |
| CA | 2237673 A1 | 12/1998 |
| WO | WO0019698 A1 | 4/2000 |

*Primary Examiner* — Sherman Ng
(74) *Attorney, Agent, or Firm* — Dority & Manning, P.A.

(57) ABSTRACT

A network interface device includes a housing. The housing includes a base and a cover, the cover connected to the base and movable relative to the base between an open position and a closed position. The network interface device further includes an insert removably connectable to the base. The insert includes a base plate, and an adapter plate extending from the base plate and defining a subscriber section of the insert and a provider section of the insert. The subscriber section and provider section are opposite each other relative to the adapter plate. The adapter plate defines one or more adapter apertures extending therethrough. The insert further includes an organizer arm which includes a support member, an upper portion extending from the support member, and a lower portion extending from the support member opposite the upper portion.

18 Claims, 7 Drawing Sheets

(56) References Cited

U.S. PATENT DOCUMENTS

| | | | |
|---|---|---|---|
| 5,359,654 A | 10/1994 | Jensen et al. | |
| 5,450,469 A | 9/1995 | Pamart et al. | |
| 5,479,505 A | 12/1995 | Butler et al. | |
| 5,515,435 A | 5/1996 | DeBalko et al. | |
| 5,528,684 A * | 6/1996 | Schneider | H01R 9/0506 |
| | | | 379/412 |
| 5,537,456 A | 7/1996 | Bonvallat et al. | |
| 5,600,717 A * | 2/1997 | Schneider | H02G 15/117 |
| | | | 348/E7.053 |
| 5,606,606 A | 2/1997 | Schneider et al. | |
| 5,901,220 A * | 5/1999 | Garver | H04M 1/0293 |
| | | | 379/399.01 |
| 6,011,831 A | 1/2000 | Nieves et al. | |
| 6,026,160 A | 2/2000 | Staber et al. | |
| 6,055,146 A | 4/2000 | Daoud | |
| 6,099,333 A | 8/2000 | Daoud et al. | |
| 6,104,805 A | 8/2000 | Daoud | |
| 6,146,149 A | 11/2000 | Daoud | |
| RE37,125 E | 4/2001 | Carlson et al. | |
| 6,246,749 B1 | 6/2001 | Garver et al. | |
| 6,256,443 B1 | 7/2001 | Uruno et al. | |
| 6,307,933 B1 | 10/2001 | Stehlin et al. | |
| 6,383,034 B1 | 5/2002 | Blake et al. | |
| 6,535,579 B1 | 3/2003 | Blake et al. | |
| 6,661,961 B1 | 12/2003 | Allen et al. | |
| 6,721,484 B1 | 4/2004 | Blankenship et al. | |
| 6,773,294 B1 | 8/2004 | Urban et al. | |
| 6,792,191 B1 | 9/2004 | Clapp, Jr. et al. | |
| 6,795,552 B1 | 9/2004 | Stanush et al. | |
| 6,815,612 B2 | 11/2004 | Bloodworth et al. | |
| 6,839,428 B2 | 1/2005 | Brower et al. | |
| 6,926,449 B1 | 8/2005 | Keenum et al. | |
| 6,990,192 B1 | 1/2006 | Denovich et al. | |
| 7,035,399 B2 | 4/2006 | Gemme et al. | |
| 7,131,845 B2 | 11/2006 | Mueller et al. | |
| 7,323,647 B1 | 1/2008 | Smith et al. | |
| 7,406,242 B1 | 7/2008 | Braga | |
| 7,409,138 B1 | 8/2008 | Frazier et al. | |
| 7,619,160 B2 | 11/2009 | Grunwald et al. | |
| 7,672,450 B2 | 3/2010 | Paulsen | |
| 8,135,256 B2 | 3/2012 | Solheid et al. | |
| 8,983,059 B2 | 3/2015 | Turner | |
| 9,442,266 B2 | 9/2016 | Kowalczyk et al. | |
| 2003/0002660 A1 | 1/2003 | Albanese | |
| 2005/0254757 A1 | 11/2005 | Ferretti, III | |
| 2006/0153516 A1 | 7/2006 | Napiorkowski | |
| 2007/0160193 A1 | 7/2007 | Vo et al. | |
| 2007/0272440 A1 | 11/2007 | Grunwald | |
| 2007/0283406 A1 | 12/2007 | Blake et al. | |
| 2008/0298764 A1 | 12/2008 | Bloodworth | |
| 2009/0060168 A1 | 3/2009 | Corry et al. | |
| 2016/0091682 A1 * | 3/2016 | Wakileh | G02B 6/445 |
| | | | 385/135 |
| 2016/0349472 A1 | 12/2016 | Clatanoff | |

\* cited by examiner

NETWORK INTERFACE DEVICES

This application is a continuation of U.S. patent application Ser. No. 16/026,871, filed on Jul. 3, 2018, the disclosure of which is incorporated by reference herein in its entirety.

FIELD

The present disclosure relates generally to improved network interface devices, and in particular to improved network interface devices for use with fiber optics.

BACKGROUND

Network interface devices ("NIDs") generally provide an interface between a provider and a subscriber wherein the provider electrical or fiber optic wiring is connected to the subscriber's premises wiring. NIDs which house and facilitate connections between fiber optic components have recently grown in popularity due to the growth of fiber optic networks.

In the current market, NIDs typically use multiple different modules and/or hardware to house the various connectors and splice sleeves required to facilitate the necessary fiber optic connections. This makes it time consuming to assemble the connectors and splice sleeves and increases the cost of the product.

Accordingly, improved NIDs are desired in art. In particular, NID designs which provide improved versatility while simplifying the assembly and connection process would be advantageous.

BRIEF DESCRIPTION

Aspects and advantages of the invention will be set forth in part in the following description, or may be obvious from the description, or may be learned through practice of the invention.

In accordance with one embodiment, a network interface device is provided. The network interface device includes a housing. The housing includes a base and a cover, the cover connected to the base and movable relative to the base between an open position and a closed position. The network interface device further includes an insert removably connectable to the base. The insert includes a base plate, and an adapter plate extending from the base plate and defining a subscriber section of the insert and a provider section of the insert. The subscriber section and provider section are opposite each other relative to the adapter plate. The adapter plate defines one or more adapter apertures extending therethrough. The insert further includes an organizer arm which includes a support member, an upper portion extending from the support member, and a lower portion extending from the support member opposite the upper portion.

In accordance with another embodiment, a network interface device is provided. The network interface device includes a housing. The housing includes a base and a cover, the cover connected to the base and movable relative to the base between an open position and a closed position. The network interface device further includes an insert removably connectable to the base. The insert includes a base plate, and an adapter plate extending from the base plate and defining a subscriber section of the insert and a provider section of the insert. The subscriber section and provider section are opposite each other relative to the adapter plate. The adapter plate defines one or more adapter apertures extending therethrough. The insert further includes an organizer arm cantilevered from the adapter plate and disposed within the subscriber section. The organizer arm includes a support member connected to the adapter plate, an upper portion extending from the support member, and a lower portion extending from the support member opposite the upper portion. The network interface device further includes an auxiliary cover removably connectable to one of the insert, base, or cover. The auxiliary cover when connected to the one of the insert, base, or cover prevents provider section access and permits subscriber section access.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
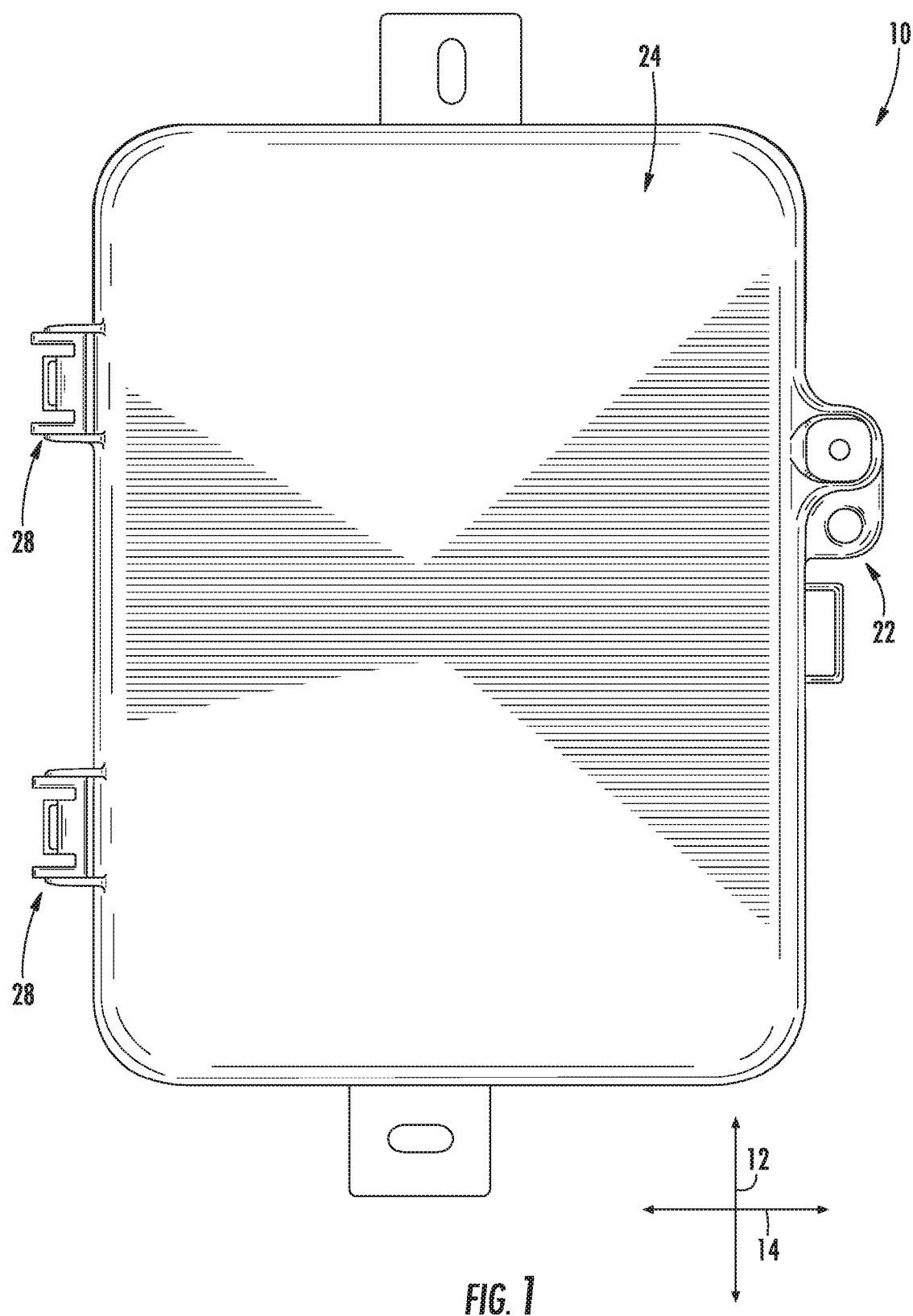
FIG. 1 is a front view of a NID, with a cover in a closed position, in accordance with embodiments of the present disclosure.
Figure 2:
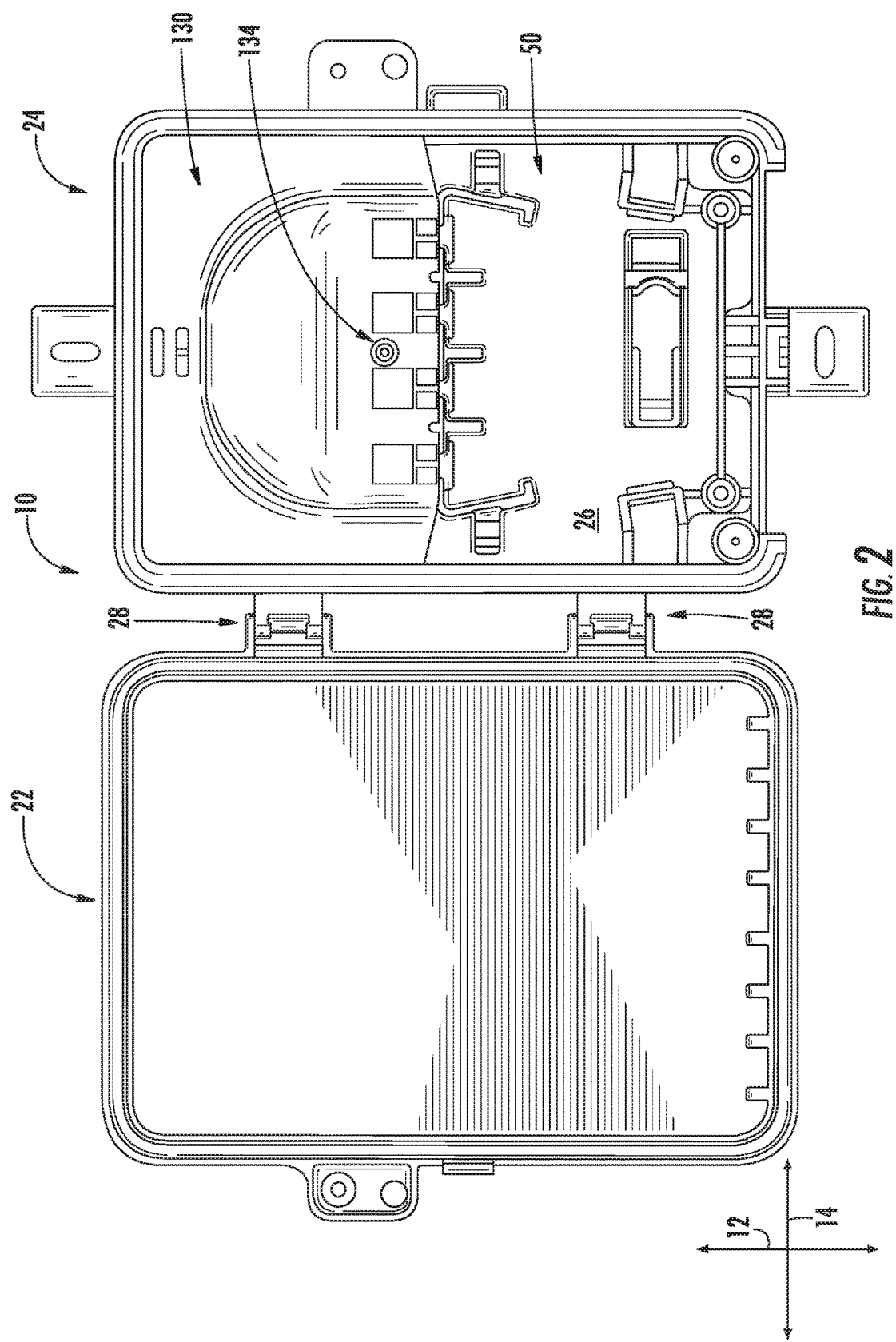
FIG. 2 is a front view of a NID, with a cover in an open position, in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally", "about", or "approximately", include values within twenty percent greater or less than the stated value. When used in the context of an angle or direction, such terms include within ten degrees greater or less than the stated angle or direction. For example, "generally vertical"

includes directions within twenty degrees of vertical in any direction, e.g., clockwise or counter-clockwise.

Referring now to FIGS. 1-7, embodiments of network interface devices 10 are illustrated. In exemplary embodiments, NIDs 10 are fiber optic NIDs in which optical fibers are connected to facilitate a provider-subscriber connection. Alternatively, however, electrical connections or other suitable provider-subscriber network connections may be made using NIDs 10 in accordance with the present disclosure.

An orthogonal coordinate system may be defined for a NID 10 in accordance with the present disclosure, including a longitudinal axis 12, lateral axis 14, and transverse axis 16, all of which may be mutually orthogonal with/to each other.

NID 10 may include a housing 20 which includes a base 22 and a cover 24. An interior 26 of the NID 10 may be defined by and between the base 22 and cover 24. For example, at least a portion of the interior 26 may defined by the base 22 and/or cover 24. Cover 24 maybe connected to the base 22, and further may be movable relative to the base 22 between an open position and a closed position. In the open position, the interior 26 and components disposed therein may be generally accessible, while in the closed position, the interior 26 and such components may be generally inaccessible. The connection between the base 22 and cover 24 may in some embodiments be a hinged connection at, for example, one or more hinges 28. Movement of the cover 24 relative to the base 22 may be a rotational movement, such as about the hinged connection. Alternatively, the connection between the base 22 and cover 24 may be a sliding connection, such that movement of the cover 24 relative to the base 22 may be a linear movement.

Base 22 may generally include a rear wall 30 which may generally extend in the longitudinal axis 12—lateral axis 14 plane. Base 22 may further include upper and lower walls 32, 34 and left and right sidewalls 36, 38, each of which may generally extend along the transverse axis 16 from the rear wall 30.

The base 22 may comprise a plurality of bosses 40. Each boss 40 may extend into and be disposed within the interior 26. For example, each boss 40 may extend generally along the transverse axis 16 from the rear wall 30 into the interior 26. As discussed herein, bosses 40 may be utilized to connect an insert of the NID 10 to the base 22. Bosses 40 can additionally or alternatively be utilized for cable slack storage, such as via holding cable rings, etc.

Figure 3:
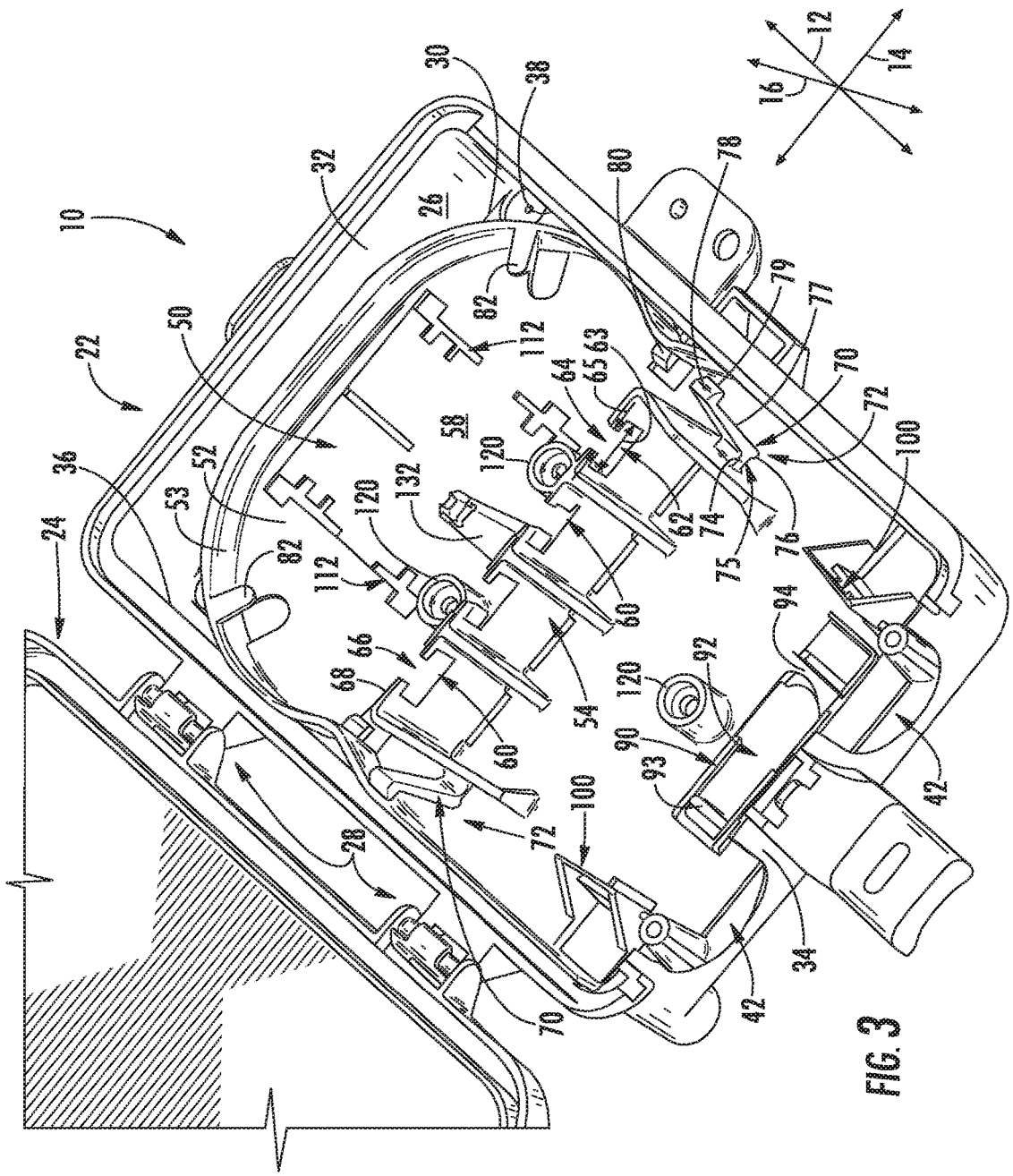
FIG. 3 is a perspective view of a base of a NID with an insert provided therein in accordance with embodiments of the present disclosure.
Figure 4:
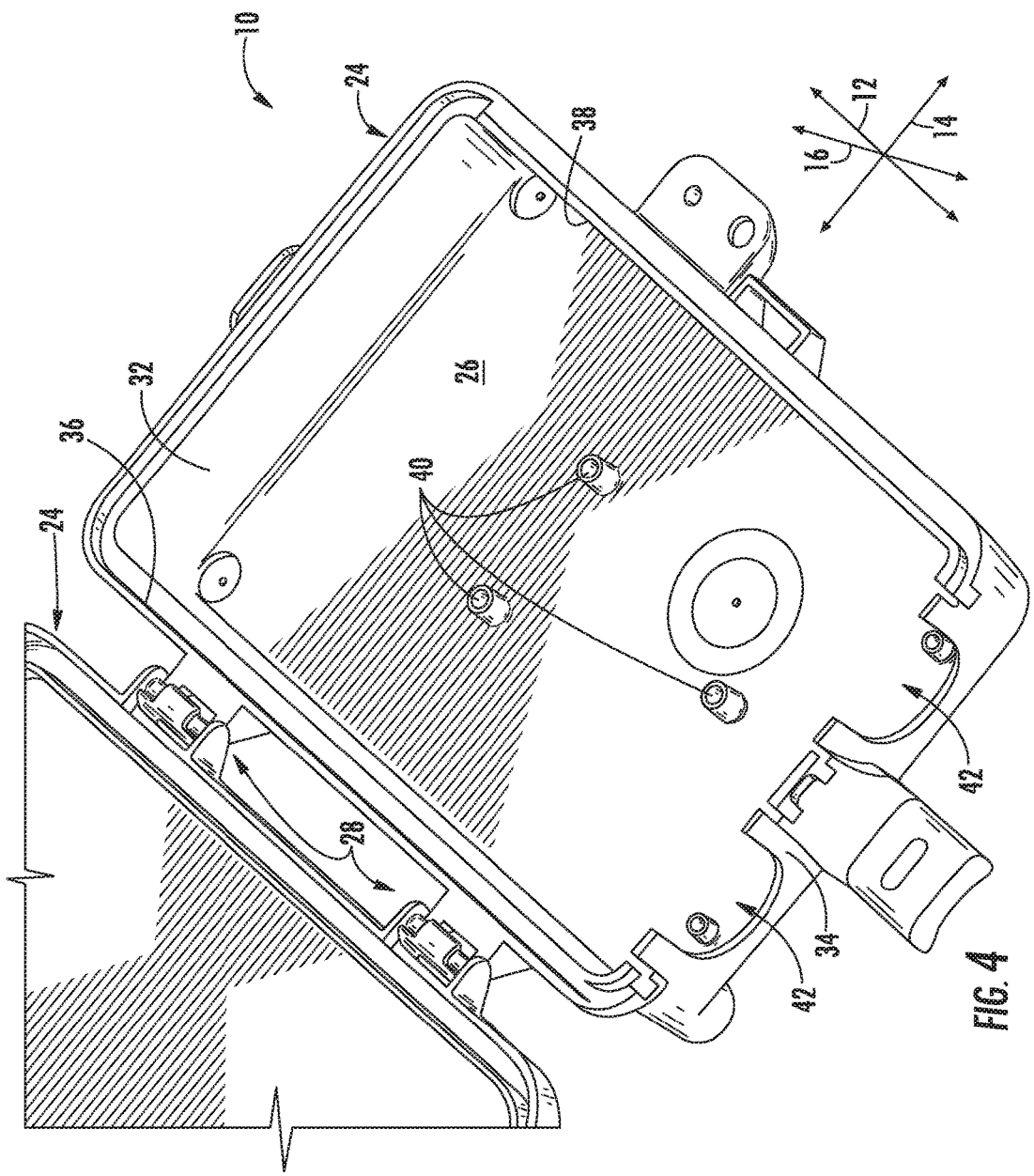
FIG. 4 is a perspective view of a base of a NID with an insert removed in accordance with embodiments of the present disclosure.
Figure 5:
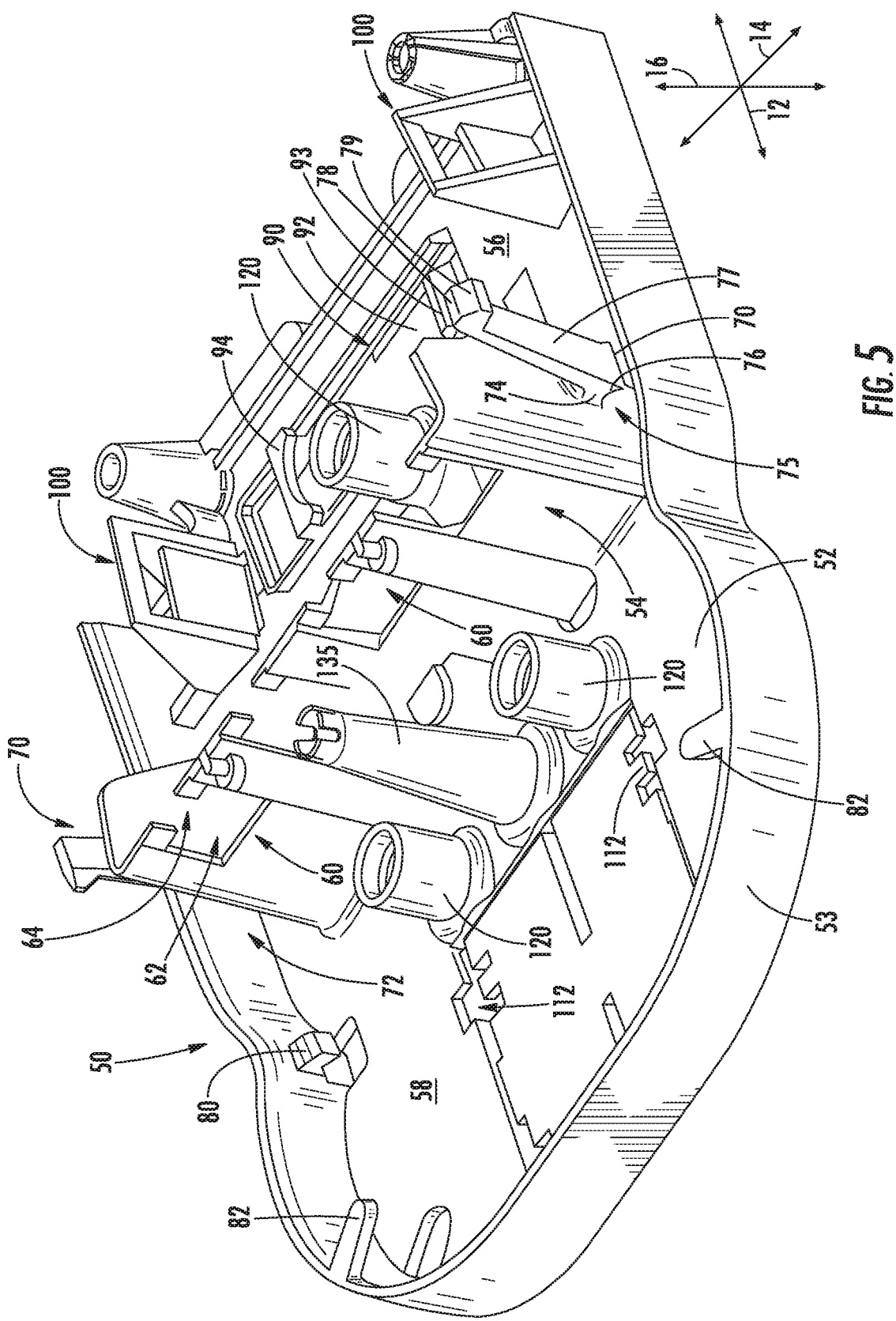
FIG. 5 is a perspective view of an insert for an NID in accordance with embodiments of the present disclosure.
Figure 6:
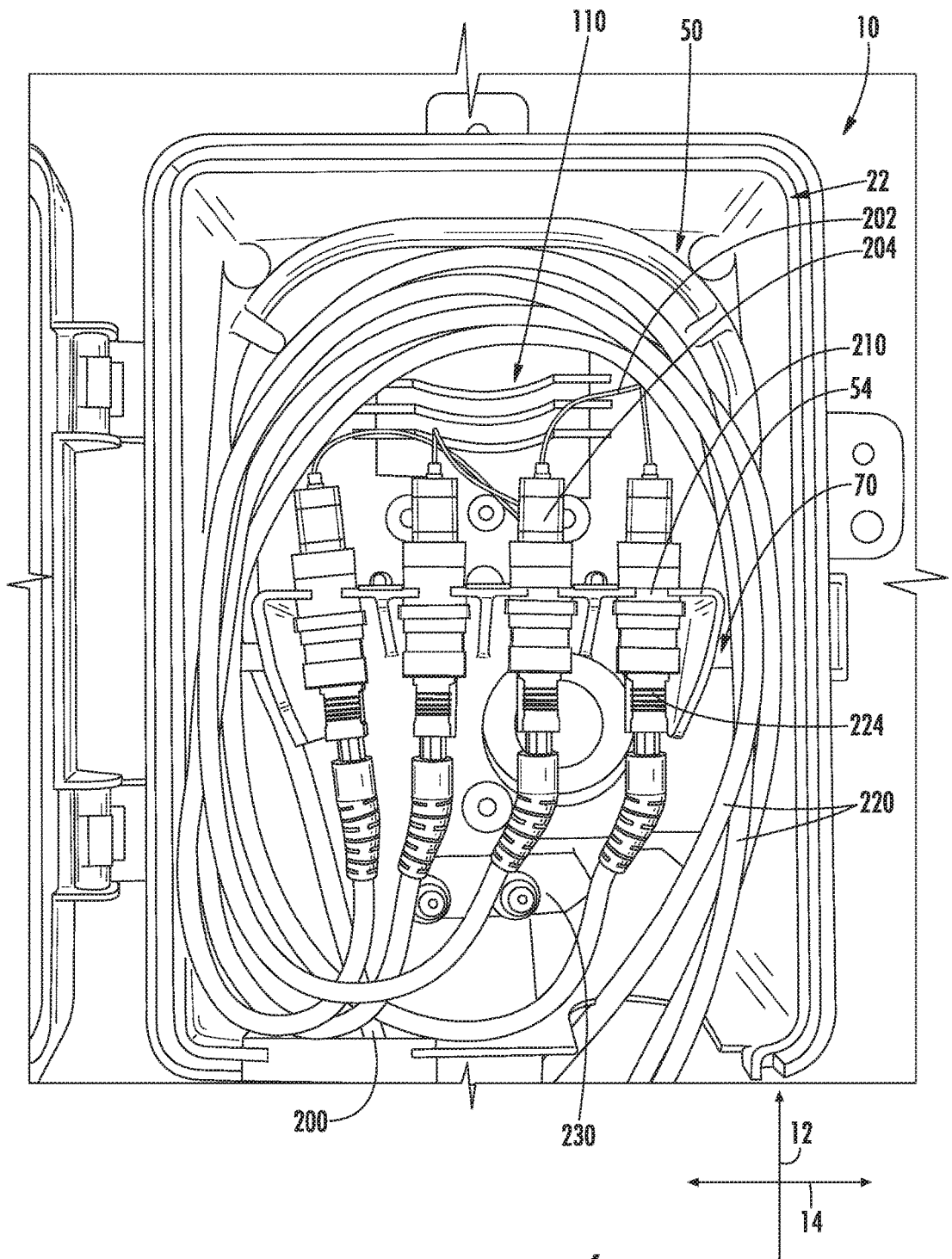
FIG. 6 is a front view of a base and insert of a NID with fiber optic cables routed therein and with an auxiliary cover removed for illustrative purposes only in accordance with embodiments of the present disclosure.
Figure 7:
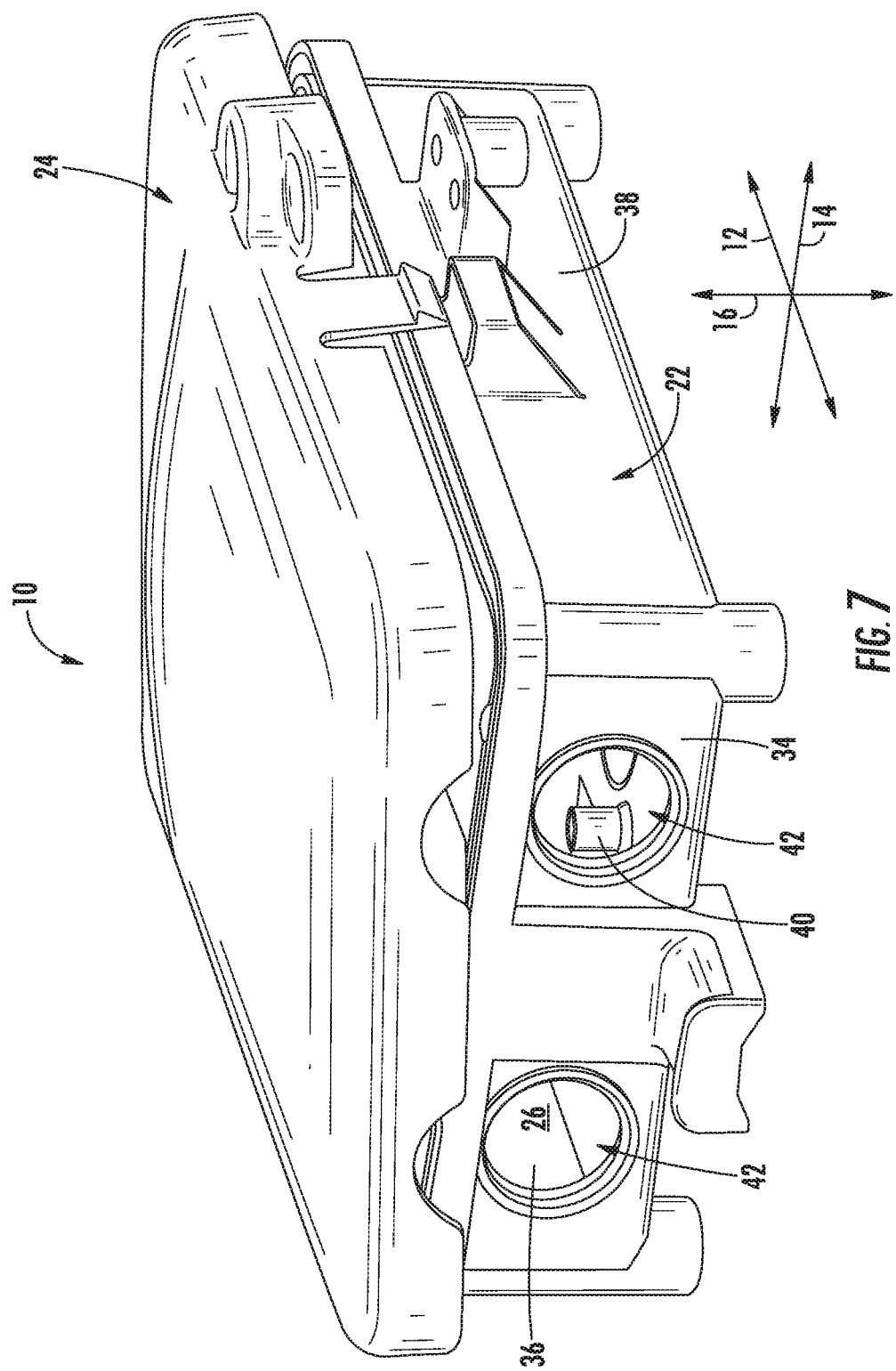
FIG. 7 is a perspective view of a NID, with a cover between an open and closed position, in accordance with embodiments of the present disclosure.

One or more cable openings 42 may be defined in the housing 20, such as in some embodiments in the base 22. For example, in some embodiments as shown, one or more openings 42 may be defined in the lower wall 34 of the base 22. The openings 42 provide access for incoming and outgoing cables, such as in exemplary embodiments fiber optic cables. In some embodiments, the openings 42 may have open peripheries, such as in U-shapes, as illustrated in FIGS. 3, 4, and 6. In other embodiments, the openings 42 may have closed peripheries, such as in O-shapes, as illustrated in FIG. 7.

NID 10 may further include an insert 50 which is removably connectable to the housing 20. The insert 50 includes various components for facilitating a connection between provider and subscriber components. Advantageously, inserts 50 in accordance with the present disclosure reduce the number of components required to facilitate such connections, simplify the connection process, and reduce the overall cost of the NID 10. Further, because inserts 50 in accordance with the present disclosure are removable, different insert designs may be easily interchanged for use in different NID environments based on different connection requirements, etc.

In exemplary embodiments, the insert 50 (and the various components thereof as discussed herein) is an integrally formed unitary component. For example, the insert 50 may be formed via an injection molding or other suitable process, and the resulting singular component may be provided in a housing 20 for use as a NID 10. Use of a unitary insert 50 advantageously further reduces the number of required components for facilitating connections, and further simplifies the connection process.

An insert 50 in accordance with the present disclosure may include a base plate 52 which may, when the insert 50 is connected to the base 22, generally extend in the longitudinal axis 12—lateral axis 14 plane. A lip 53 may extend from the base plate 52, such as generally along the transverse axis 16. Lip 53 may define a periphery of the plate 52, thus extending from and around an edge thereof. Lip 53 may define a partial periphery of the plate 52, as shown, or may define an entire periphery of the plate 52. For example, in some embodiments as shown, a bottom-most portion (along the longitudinal axis 12) of the plate 52 may be left open, with no lip, while side portions and an uppermost portion may include the lip 53.

An adapter plate 54 may extend from the base plate 52, such as generally along the transverse axis 16. Adapter plate 54 may further extend generally along the lateral axis 14. The adapter plate 54 may serve as a partition which divides the insert 50 into a subscriber section 56 and a provider section 58. As shown, the subscriber section 56 and provider section 58 may be opposite each other relative to the adapter plate 54, i.e. on opposing sides of the adapter plate 54.

One or more, and in some embodiments a plurality of, adapter apertures 60 may be defined in the adapter plate 54. Each aperture 60 may be sized to accommodate an adapter 210 therein. Any suitable adapter, such as an SC adapter, LC adapter, multi-fiber adapter, etc., may be utilized and suitably accommodated in each aperture 60. The apertures 60 may, for example, be arranged in a linear array, i.e. a row, as shown.

In exemplary embodiments, each adapter aperture 60 includes a connector gap 62 and a connector slot 64. The connector slot 64 may be connected to the connector gap 62, with a width 65 of the connector slot 64 being less than a width 63 of the connector gap 62. Further, the connector slot 64 may define an open slot 66 in the adapter plate 54, i.e. in an outer edge 68 thereof. When an adapter 210 is inserted into an aperture 60, the adapter 210 may be position in the connector gap 62. Connector slot 64 advantageously facilitates the removal of the adapter 210 if necessary while maintaining cable connections on the subscriber section 56 side and/or provided section 58 side thereof. For example, the adapter 210 can be removed directly from the connector gap 62, and any cable that is connected to the adapter 210 (i.e. via a suitable connector) can be removed through the connector slot 64 and open slot 66 thereof. This is particularly advantageous when removal is necessary and cable connections are desired to be maintained on both the subscriber section 56 side and provider section 58 side.

The insert 50 may further include one or more organizer arms 70. In exemplary embodiments, a plurality of organizer arms 70 (such as two as shown or more) may be provided. For example, organizer arms 70 may be positioned on opposite sides of the insert 50 along the lateral axis 14. In some embodiments, organizer arms 70 may face in opposite outwardly facing directions as shown. Channels 72 past the adapter plate 54 may thus be defined between the adapter plate 54 and the lip 53.

Each organizer arm 70 may include features to guide and organizer various cable and optical fiber features within the insert 50. For example, each organizer arm 70 may include a support member 74 which connects to another component of the insert 50 to support the organizer arm 70. In exemplary embodiments, the organizer arm 70 is cantilevered from this other component. For example, as shown, in some embodiments the support member 74 is connected to the adapter plate 54 such that the organizer arm is cantilevered from the adapter plate 54. Alternatively, the support member 74 may be connected to (and cantilevered from) the lip 53 or another suitable component of the insert 50.

An organizer arm 70 may further include a lower portion 76 which extends from the support member 74, such as generally along the transverse axis 16 towards the base plate 52. Further, in some embodiments, a bottom surface 75 of the support member 74 may be curvilinear. The lower portion 76, as well as the bottom surface 75, may be utilized to store and organize incoming or outgoing cables, such as in some embodiments provider side cables 200 after the cables enter (for example through openings 42) and are routed within the interior 26. For example, the cables may be routed between the lower portion 76, bottom surface 75, and the component to which the organizer arm 70 is connected (such as the adapter plate 54 in some embodiments).

An organizer arm 70 may further include an upper portion 77 which extends from the support member 74 opposite the lower portion 76, such as generally along the transverse axis 16 away from the base plate 52. In some embodiments, a tab 79 may extend from the upper portion 77, such as from a tip 78 thereof at a distal end of the upper portion 77. Tab 79 may, for example, face away from the support member 74 and be located on an opposing side of the upper portion 77 relative to the support member 74. The upper portion 77, as well as the tab 79, may be utilized to store and organize incoming or outgoing cables, such as in some embodiments outgoing subscriber side cables 220 as they are routed within the interior 26 before the cables exit (for example through openings 42). For example, the cables may be routed between the upper portion 77 and tab 79.

In exemplary embodiments, the organizer arm(s) 70 may be disposed in the subscriber section 56. Alternatively, the organizer arm(s) 70 may be disposed in the provider section 58 or between the subscriber section 56 and provider section 58.

Insert 50 may further include additional features for routing cables, optical fibers, etc., therein. For example, insert 50 may include one or more organizer hooks 80. Each hook 80 may, for example, extend from the lip 53 into the interior of the insert. Cables or optical fibers may be routed underneath each hook 80. In exemplary embodiments, hooks 80 may be disposed in the provider section 58. Additionally or alternatively, insert 50 may include one or more organizer tabs 82. Each tab 82 may, for example, extend from the lip 53 into the interior of the insert. Cables or optical fibers may be routed underneath each tab 82. In exemplary embodiments, tabs 82 may be disposed in the provider section 58.

Insert 50 may further include a ground mount 90. Ground mount 90 may provide a location for connecting a ground 230 to the insert 50 and NID 10 in general. Notably, any suitable ground 230 having any suitable grounding connections may be utilized with ground mount 90. Ground mount 90 may, for example, be disposed in the subscriber section 56. In exemplary embodiments, a ground mount 90 may include a snap arm 92. Snap arm 92 may be a cantilevered portion of the base plate 52 as shown, or a standalone component connected to the base plate 52 or at another location. A distal end of the snap arm 92 may include a tab 93. Ground mount 90 may further include a bridge 94. The ground 230 may be inserted underneath the bridge 94 until the ground passes over a tab 93 of the snap arm 92, at which point the ground 230 is securely connected to the insert 60. To remove the ground 230, the snap arm 92 may be moved such that the ground 230 can slide past the tab 93 and underneath the bridge 94.

Insert 50 may further include one or more tie-bars 100. Tie-bars 100 may provide a location which anchors hook-and-loop style ties, zip ties, fabric, rope, etc., wrapped around a tie-bar 100 and fastened together with one or more cables extending therethrough. Use of such tie-bars 100 provides further cable organization in the NID 10. In exemplary embodiments, tie-bars 100 may be disposed in the subscriber section 56.

In some embodiments, a splice module 110 may be provided in the NID 10. Splice module 110 may be connected to the insert 50, such as to the base plate 52 thereof, via openings 112 defined in the base plate 52. In exemplary embodiments, such openings may be defined in the provider section 58.

As discussed, the insert 50 may be removably connectable to the base 22. For example, the insert 50 may include a plurality of shells 120. Each shell 120 may extend from the base plate 52, such as generally along the transverse axis 16. Further in exemplary embodiments, the locations of the shells 120 may generally correspond to the locations of the bosses 40. In exemplary embodiments, one or more shells 120 may be located in the subscriber section 56 and one or more shells 120 may be located in the provider section 58. To connect the insert 50 to the base 22, the insert 50 may be placed in the interior 26 such that each shell is positioned on one of the plurality of bosses 40. If necessary, additionally mounting hardware may in some embodiments be inserted through each boss 40 and corresponding shell 120 to removably connect them together.

In some exemplary embodiments, an auxiliary cover 130 may be provided in NID 10. The auxiliary cover 130 may be disposed in the interior 26 and removably connected to one of the insert 50, base 22, or cover 24, such as in exemplary embodiments the insert 50 as shown. Auxiliary cover 130 generally restricts access to the provider section 58 and protects bare optical fiber therein. For example, when connected to the insert 50, base 22, or cover 24, the auxiliary cover 130 may prevent provider section 58 access (i.e. through the auxiliary cover 130) and permit subscriber section 56 access. In exemplary embodiments, the auxiliary cover 130 may be connected to the insert 50. For example, a post 132 may extend from the insert 50, such from the base plate 52 thereof. Post 132 may, for example, extend generally along the transverse axis 16 and in the provider side 56. A bolt 134 or other suitable mounting hardware may be inserted through the auxiliary cover 130 and connected to the post 132 to removably connect the auxiliary cover 130 to the insert 50.

In use, provider side cables 200 (which in exemplary embodiments are fiber optic cables) may initially be routed within an insert 50. Such cables 200 may, for example, be drop cables from a network (such as a fiber optic network). In some embodiments, outer jacketing of the cables 200 may be stripped, and buffer tubes of the cables 200 routed within the NID 10. Such cables 200 may be routed into the subscriber section 56, and through channels 72 and lower portion 76 of organizer arms 70 into the provider section 58. Within the provider section 58, such cables 200, buffer tubes, and/or optical fibers 202 thereof may further be routed through hooks 80 and/or tabs 82 as desired/required. Within the provider section 58, any necessary splicing of optical fibers 202 of such cables 202 may occur, such that connectors 204 are connected to the optical fibers 202 and cable 200. These connectors 204 may be inserted into adapters 210 on the provider sides thereof. Once any necessary provider side connections are made, auxiliary cover 130 may be connected to the insert 50, base 22, or cover 24 to restrict access to the provider section 58.

Before or after such provider side routing and connections, the insert 50 may be removably connected to the housing 20, such as to the base 22 thereof. In exemplary embodiments, the design and features of the insert 50 as discussed herein advantageously allow for such routing and connections to be performed before connection of the insert 50 to the housing 20. Accordingly, the installer has more room to perform such routing and connections, resulting in easier and more efficient installation of the fiber optic network through and utilizing the NID 10. Notably, once the insert 50 is connected to the housing 20 and the provider side routing and connections are complete cables 200 may be routed such that they enter the subscriber section 56 through openings 42.

When a connection to a provider side cable 200 is desired, a subscriber side cable 220 (which in exemplary embodiments is a fiber optic cable) may be routed into the housing 20, such as through an opening 42. If necessary, excess cable 220 may be routed through channels 72 and upper portion 77 and tab 79 of organizer arms 70. However, the auxiliary cover 130 may prevent such cables 220 from entering the provider section 58. The cables 220 may extend be routed within the provider section 58 and back through channels 72 and upper portion 77 and tab 79 of organizer arms 70 into subscriber section 56. Connectors 224 which are connected to the optical fibers of cables 220 may be inserted into adapters 210 on the subscriber sides thereof to make the connection (which in some embodiments may be an optical connection) with the corresponding provider side cable 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A network interface device, comprising: a housing, the housing comprising a base and a cover, the cover connected to the base and movable relative to the base between an open position and a closed position; and an insert removably connectable to the base, the insert comprising: a base plate; and an adapter plate extending from the base plate and defining a subscriber section of the insert and a provider section of the insert, the subscriber section and provider section opposite each other relative to the adapter plate, the adapter plate defining one or more adapter apertures extending therethrough, wherein each of the one or more adapter apertures comprises an connector gap and an connector slot, the connector slot having a width that is less than a width of the connector gap, the connector slot defining an open slot in the adapter plate.

2. The network interface device of claim 1, wherein the insert further comprises an organizer arm disposed in the subscriber section, the organizer arm comprising a support member, an upper portion extending from the support member, and a lower portion extending from the support member opposite the upper portion, wherein the support member is connected to the adapter plate such that the organizer arm is cantilevered from the adapter plate.

3. The network interface device of claim 2, wherein a bottom surface of the support member is curvilinear.

4. The network interface device of claim 2, wherein the organizer arm further comprises a tab extending from a tip of the upper portion.

5. The network interface device of claim 1, wherein the insert further comprises an organizer hook, the organizer hook disposed in the provider section.

6. The network interface device of claim 1, wherein the insert further comprises an organizer tab, the organizer tab disposed in the provider section.

7. The network interface device of claim 1, wherein the insert further comprises a lip, the lip extending from and defining a periphery of the base plate.

8. The network interface device of claim 1, wherein the insert further comprises a ground mount, the ground mount comprising a snap arm and a bridge.

9. The network interface device of claim 1, further comprising an auxiliary cover removably connectable to one of the insert, base, or cover, wherein the auxiliary cover when connected to the one of the insert, base, or cover prevents provider section access and permits subscriber section access.

10. The network interface device of claim 1, wherein the base comprises a plurality of bosses and the insert comprises a plurality of shells, each of the plurality of shells positionable on one of the plurality of bosses to connect the insert to the base.

11. The network interface device of claim 1, wherein the insert is an integrally formed unitary component.

12. A network interface device, comprising: a housing, the housing comprising a base and a cover, the cover connected to the base and movable relative to the base between an open position and a closed position; an insert removably connectable to the base, the insert comprising: a base plate; and an adapter plate extending from the base plate and defining a subscriber section of the insert and a provider section of the insert, the subscriber section and provider section opposite each other relative to the adapter plate, the adapter plate defining one or more adapter apertures extending therethrough; wherein each of the one or more adapter apertures comprises an connector gap and an connector slot, the connector slot having a width that is less than a width of the connector gap, the connector slot defining an open slot in the adapter plate; and an auxiliary cover removably connectable to one of the insert, base, or cover, wherein the auxiliary cover when connected to the one of the insert, base, or cover prevents provider section access and permits subscriber section access.

13. The network interface device of claim 12, wherein the insert further comprises an organizer arm disposed in the subscriber section, the organizer arm comprising a support member, an upper portion extending from the support member, and a lower portion extending from the support member opposite the upper portion, wherein the support member is connected to the adapter plate such that the organizer arm is cantilevered from the adapter plate.

14. The network interface device of claim 13, wherein a bottom surface of the support member is curvilinear.

15. The network interface device of claim 13, wherein the organizer arm further comprises a tab extending from a tip of the upper portion.

16. The network interface device of claim 12, wherein the insert further comprises an organizer hook, the organizer hook disposed in the provider section.

17. The network interface device of claim 12, wherein the insert further comprises a ground mount, the ground mount comprising a snap arm and a bridge.

18. The network interface device of claim 12, wherein the insert is an integrally formed unitary component.

* * * * *